May 24, 1955     M. W. HOFFMAN     2,709,107
RATTLE ELIMINATING DEVICE FOR VEHICLE WINDOWS
Filed April 18, 1952

Matthew W. Hoffman
INVENTOR.

United States Patent Office 2,709,107
Patented May 24, 1955

2,709,107

RATTLE ELIMINATING DEVICE FOR VEHICLE WINDOWS

Matthew W. Hoffman, New Castle, Pa.

Application April 18, 1952, Serial No. 283,053

2 Claims. (Cl. 296—44)

This invention relates to new and useful improvements and structural refinements in anti-rattling devices for vehicle windows, and the principal object of the invention is to provide a device of the character herein described, which may be conveniently and expeditiously installed in window structures of automobile bodies or the like, for the purpose of eliminating rattles therein.

Some of the advantages of the invention reside in its extreme simplicity of construction, in its adaptability to expeditious installation in window structures of different sizes and types, and in its adaptability to economical manufacture.

Figure 1:
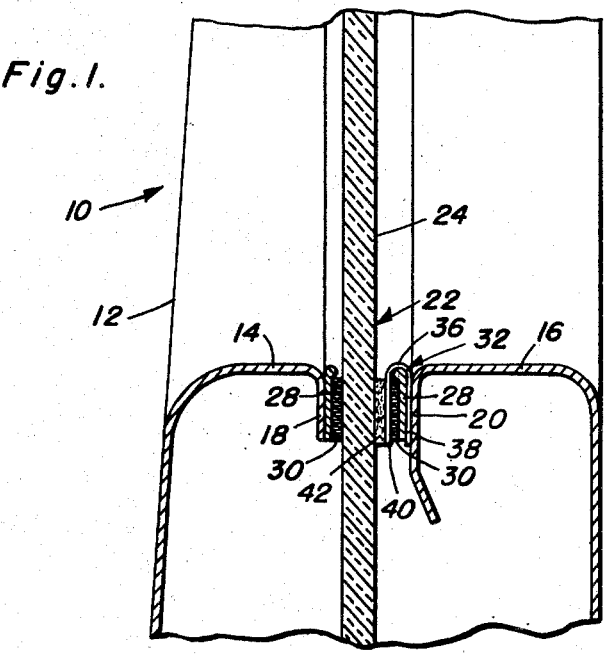
Figure 2:
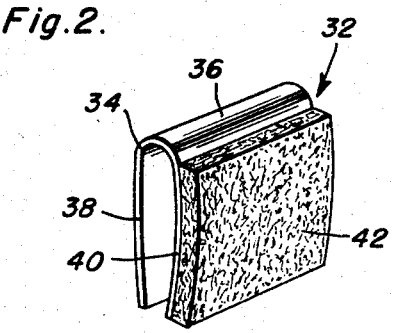

With the above more important objects and features in view and such other objects and features as may become apparent as this specification proceeds, the invention consists essentially of the construction and arrangement of parts as shown in the accompanying drawings in which:

Figure 1 is a fragmentary vertical sectional view of a vehicle window structure, showing the invention installed therein; and, Figure 2 is a perspective view of the invention per se.

Like characters of reference are employed to designate like parts in the specification and throughout the several views.

Referring now to the accompanying drawings in detail, the general reference character 10 designates a vehicle window structure including a frame 12 consisting of a pair of spaced sections 14, 16 provided with spaced, inturned and opposing flanges 18, 20 respectively, which afford therebetween a passage 22 for the usual sliding window glass 24.

In accordance with conventional practice, a pair of cushioning strips 28, having felt facing 30, are secured to the opposing surfaces of the flanges 18, 20 of the window frame sections to normally engage the glass 24 and prevent vibration.

However, after the felt on these cushioning strips becomes worn, the window glass commences to rattle against the strips or against other parts of the window frame, and the instant invention is primarily designed to eliminate rattles of this nature.

The invention is embodied in a device which is designated generally by the reference character 32 and is in the form of an inverted, substantially U-shaped member 34 of resilient material, including an arcuate bight portion 36 and a pair of spaced, arcuate and laterally convexed side portions 38, 40. The side portion 40 has secured to the outer surface thereof a resilient pad 42, as shown.

When the invention is placed in use, the side portion 38 of the device 32 is inserted between the flange 20 and the associated cushioning strip 28 while the side portion 40 is disposed between that cushioning strip and the glass 22, with the resilient pad 42 slidably engaging the glass and eliminating any possible rattles.

The device 32 is sustained in position not only by the disposition of the side portion 38 between the flange 20 and the associated strip 28, but also by the resilient clamping action of the side portions 38, 40 on the strip 28 which they embrace. When properly installed, the bight portion 36 of the device 32 is seated on the upper edge of the associated cushioning strip 28 as illustrated in Figure 1.

As is understood by those skilled in this art, the frame members 14 and 16 are sometimes referred to as garnish moldings and extend generally horizontally so as to define the bottom portion of an upright window opening across which the glass 24 extends. The laterally spaced flanges 18 and 20 of the frame portions 14 and 16 thus define the guide passage 22 as being a horizontally elongated passage in which the window glass 24 is vertically movable.

From the above description of the anti-rattle device 32, and the illustration thereof in Fig. 2, it will be seen that this device is in the form of a clip whose side portions 38 and 40 are generally flat plate-like side portions and which clip is relatively short in comparison to the length of the cushioning strip 28 on which it is mounted, such that the anti-rattle device extends along the guide passage 24 for a minor portion only of the horizontal length of such guide passage. It will be observed also that the resilient pad 42 corresponds generally in size and shape with the side portion 40 on which it is secured and covers the major portion of the area of the outer face of such side portion.

It is believed that the advantages and use of the invention will be readily understood from the foregoing disclosure and accordingly further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of this invention as claimed.

Having described the invention, what is claimed as new is:

1. The combination of a vehicle window structure including a frame having a pair of spaced substantially horizontally coextending bottom frame portions defining therebetween a horizontally elongated upright guide passage, a substantially vertically movable window glass extending through and having guided movement in said guide passage, a cushioning strip in said guide passage and engaging said glass, said cushioning strip being secured to one of said frame portions and being substantially horizontally coextensive with said guide passage, and a rattle eliminating device in the form of a clip of a substantially inverted-U shape and comprising a pair of spaced generally flat plate-like side portions and a bight portion connecting said side portions along the upper edge of the clip, one of said side portions being disposed between said one frame portion and said cushioning strip for mounting said clip on the latter and the other of said side portions being disposed between said cushioning strip and said glass, and a resilient pad secured to the outer face of said other side portion and engaging said glass, said pad corresponding generally in size and shape with said other side portion and covering the major portion of the area of said outer face, said clip being relatively short in comparison to the length of said cushioning strip and extending along said guide passage for a minor portion only of the horizontal length of said guide passage.

2. A vehicle window rattle eliminating device as defined in claim 1 in which said bight portion is seated on the longitudinal upper edge of said cushioning strip.

(References on following page)

References Cited in the file of this patent

UNITED STATES PATENTS

| | | |
|---|---|---|
| 1,569,146 | Simon | Jan. 12, 1926 |
| 1,641,157 | Cook | Sept. 6, 1927 |
| 1,952,669 | Grimm | Mar. 27, 1934 |
| 2,196,888 | Bailey | Apr. 9, 1940 |

OTHER REFERENCES

"Mitchell Auto Body Hardware" Catalog, published for the Mitchell Specialty Co., Philadelphia, Pa. Received in the Patent Office March 17, 1925; page 51, Figure No. 275 entitled "Glass Anti-Rattler."